United States Patent [19]

Ravenhall et al.

[11] Patent Number: 5,511,604
[45] Date of Patent: Apr. 30, 1996

[54] METHOD FOR MAKING A TITANIUM METAL MATRIX COMPOSITE

[75] Inventors: Richard Ravenhall, Cincinnati; Charles R. Wojciechowski; Stephen C. Mitchell, both of West Chester, all of Ohio; Gary D. Mercer, Ballston Lake, N.Y.; Thomas J. Kelly, Cincinnati, Ohio; Melvin A. Schobert, Cincinnati, Ohio; Harvey M. Maclin, Cincinnati, Ohio

[73] Assignee: General Electric Company, Cincinnati, Ohio

[21] Appl. No.: 355,128

[22] Filed: Dec. 13, 1994

Related U.S. Application Data

[62] Division of Ser. No. 76,670, Jun. 15, 1993, Pat. No. 5,439,750.

[51] Int. Cl.⁶ ............................................. B22D 19/14
[52] U.S. Cl. ....................................... 164/97; 164/100
[58] Field of Search ............................ 164/97, 98, 100

[56] References Cited

U.S. PATENT DOCUMENTS

| | | | |
|---|---|---|---|
| 3,745,854 | 7/1973 | Haag et al. | 74/606 R |
| 4,314,007 | 2/1982 | Gessinger | 428/614 |
| 4,606,631 | 8/1986 | Anno et al. | 356/39 |
| 4,651,631 | 3/1987 | Avezou | 92/224 |
| 4,669,523 | 6/1987 | Sabatie et al. | 164/97 |
| 4,852,630 | 8/1989 | Hamajima et al. | 164/761 |
| 4,932,099 | 6/1990 | Corwin | 164/97 |
| 4,941,669 | 7/1990 | Fujisawa | 428/614 |
| 5,066,546 | 11/1991 | Materkowski | 428/614 |
| 5,098,178 | 3/1992 | Ortabasi | 428/614 |
| 5,260,137 | 11/1993 | Rosenthal | 428/614 |
| 5,381,850 | 1/1995 | Otte et al. | 164/97 |

FOREIGN PATENT DOCUMENTS 0280830  9/1988  European Pat. Off. ........ 164/100

*Primary Examiner*—Kuang Y. Lin
*Attorney, Agent, or Firm*—Andrew C. Hess; David L. Narciso

[57] ABSTRACT

A cast article having a reinforced structural composite core is disclosed. The cast article includes a structural element which is embedded in the otherwise cast metal article. The structural element is comprised of a metal matrix composite structural core. It includes a plurality of reinforcing fibers within a metal matrix. The fibers are generally a non-metallic material such as a ceramic which degrade at a temperature below the melting temperature of the cast metal comprising the article. The metal matrix composite structural core is encased with a sheath. The sheath, attached to and completely surrounding the core, is made of the same metal as the cast metal article. In a preferred embodiment, the article is a titanium alloy strut for a gas turbine engine.

6 Claims, 4 Drawing Sheets

METHOD FOR MAKING A TITANIUM METAL MATRIX COMPOSITE

This application is a division of application Ser. No. 08/076,670, filed Jun. 15, 1993 now U.S. Pat. No. 5,439,750.

BACKGROUND OF THE INVENTION

1. Field of the Invention

This invention relates generally to reinforced structural components and, more particularly, to reinforced structural composite castings for aircraft engines with parts made of titanium.

2. Description of the Prior Art

Presently, many high strength aircraft engine structural components are made of titanium or an alloy thereof. One such component is an aircraft gas turbine engine fan frame, particularly the struts thereon. Titanium, as opposed to aluminum or steel, is the material of choice because of its low density, high strength and high stiffness. However, recent aircraft design specifications demand lighter, more energy efficient and more powerful aircraft engines. Under present technology, aircraft engine structural parts made of cast titanium are at their limits with respect to strength, weight and stiffness characteristics.

In other fields of technology, cast metal structural parts have used cast-in-place structural inserts to strengthen and/or stiffen the part. See, for example, U.S. Pat. Nos. 4,651,631; 4,606,395; 4,852,630; 4,669,523 and 3,745,854. However, titanium has an extremely high melting temperature, on the order of in excess of 2900° F. At these high temperatures, all known lightweight reinforcing materials degrade or melt. However, a proposal for titanium composite engine components submitted jointly by Howmet Corporation and General Electric Company to the U.S. Air Force in Proposal Number PRDA-NR-91-04-MLKT on Mar. 28, 1991 which proposed the possibility of using a cast-in-place insert for a titanium structural component. This proposal discusses a concept of casting a titanium strut around an insert made of a metal matrix composite made of metal and a ceramic reinforcing material. However, it is now believed, as a result of subsequent experimentation, that the reinforcing material in the structure of the proposal would normally degrade in this arrangement during the casting procedure due to the high temperature of the molten titanium.

Therefore, it is an object of our invention to provide a cast titanium structural component with a cast-in-place structural insert made of a dissimilar material that will not degrade during casting.

It is a further object of the present invention to provide an improved structural component for aircraft and/or aircraft engines.

It is yet a further object of the present invention to provide a process for making an improved structural component.

SUMMARY OF THE INVENTION

A reinforced structural composite cast article is disclosed. The composite cast article is preferrably a cast strut for use in an aircraft engine. The cast article, in the preferred embodiment a strut, includes a structural element which is embedded in the otherwise cast metal article. The structural element is comprised of a metal matrix composite structural core. This metal matrix composite core is a standard metal matrix composite manufactured by methods well-known to those skilled in the art. It includes a plurality of reinforcing fibers within a metal matrix. The fibers are generally a non-metallic material such as a ceramic which degrade at a temperature below the melting temperature of the cast metal comprising the article, which is frequently the same metal comprising the metal matrix. The metal matrix composite structural core is encased with a sheath. The sheath, attached to and completely surrounding the core, is made of the same metal as the cast metal article. Thus for example, an article such as a strut for an aircraft engine is comprised of a metal matrix composite structural core in which the metal matrix component is a titanium or titanium alloy reinforced with a plurality of ceramic fibers. The core is encased completely with a titanium or titanium alloy sheath. The remainder of the strut is comprised of a casting of titanium or titanium alloy.

The metal sheath attached to and completely enveloping the composite core protects the core in the casting mold as the molten titanium is poured into the mold. The hot metal, in liquid form has a sufficiently high temperature to degrade the fibers of the composite core should the core be exposed to the molten metal However, the molten metal contacts the metal sheath which partially melts as it is contacted by the molten metal. However, the molten metal solidifies around the sheath before the sheath can completely melt. The resulting article is a cast structure having a composite core.

The processing of the article requires a careful balance of molten metal volume, molten metal temperature and sheath thickeness. Too great a molten metal volume will cause too much of the sheath to melt, thereby exposing the underlying core and degrading the article. In a similar fashion, excessive superheat will also cause the sheath to melt, thereby exposing the core to molten metal. However, failure to provide molten metal to the mold at a sufficiently high temperature will result in casting defects such as cold shuts and misruns. Thus, the manufacture of the article requires careful monitoring of such critical parameters such as molten metal temperature, metal volume, and sheath thickness.

The principle advantage of such an article is that a substantial portion of the article which was previously cast can be replaced with a light weigh metal matrix composite structural core, resulting in an integral part having at least the same strength, stiffness but having a lighter weight. This is a significant and important factor in aircraft engines, and in aircraft manufacture generally, since lighter weights are highly desirable because they significantly reduce operating costs and improve fuel efficiencies.

DESCRIPTION OF THE PREFERRED EMBODIMENTS

Figure 1:
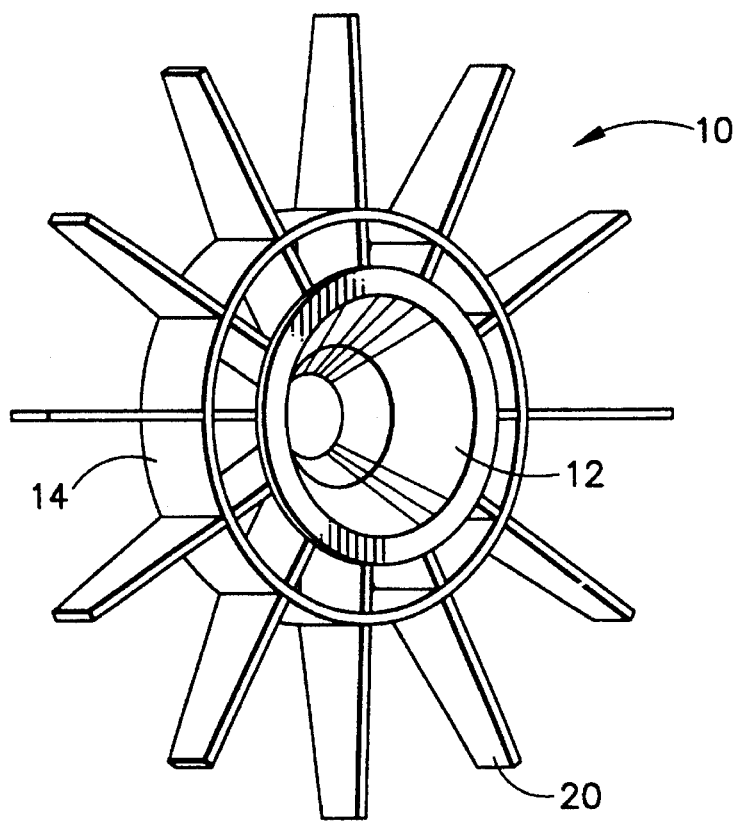
FIG. 1 is a perspective view of a turbine engine frame made in accordance with the present invention.

FIG. 1 shows a turbine gas frame 10 made in accordance with the present invention. The frame 10 supports a jet aircraft turbine engine in a manner well-known in the art. The frame 10 includes an inner cone 12 and an outer ring 14. A plurality of struts 20 made in accordance with the present invention pass through the outer ring 14 and abut the inner cone 12.

Figure 2:
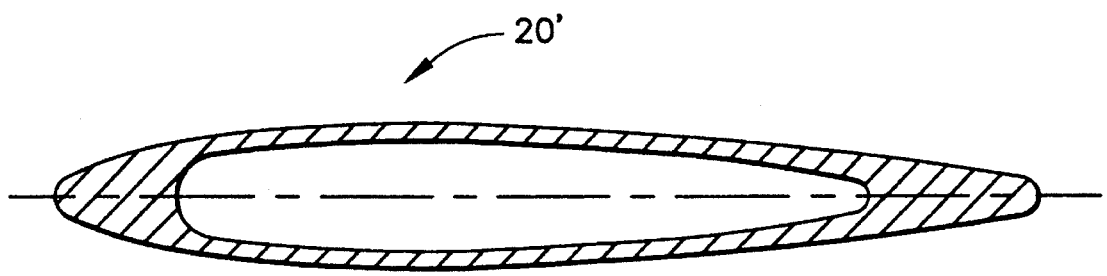
FIG. 2 discloses a prior art engine strut.
Figure 3:
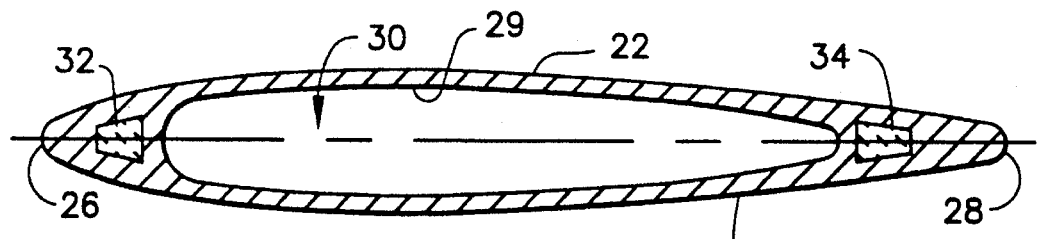
FIG. 3 is a cross-sectional view of an engine strut made in accordance with the present invention.

FIG. 2 shows a cross section of a prior art cast titanium strut 20'. FIG. 3 shows a cross section of a cast titanium strut made in accordance with the present invention. The difference between the struts 20 and 20' is a cast-in-place structural insert, which will be discussed below.

Figure 4:
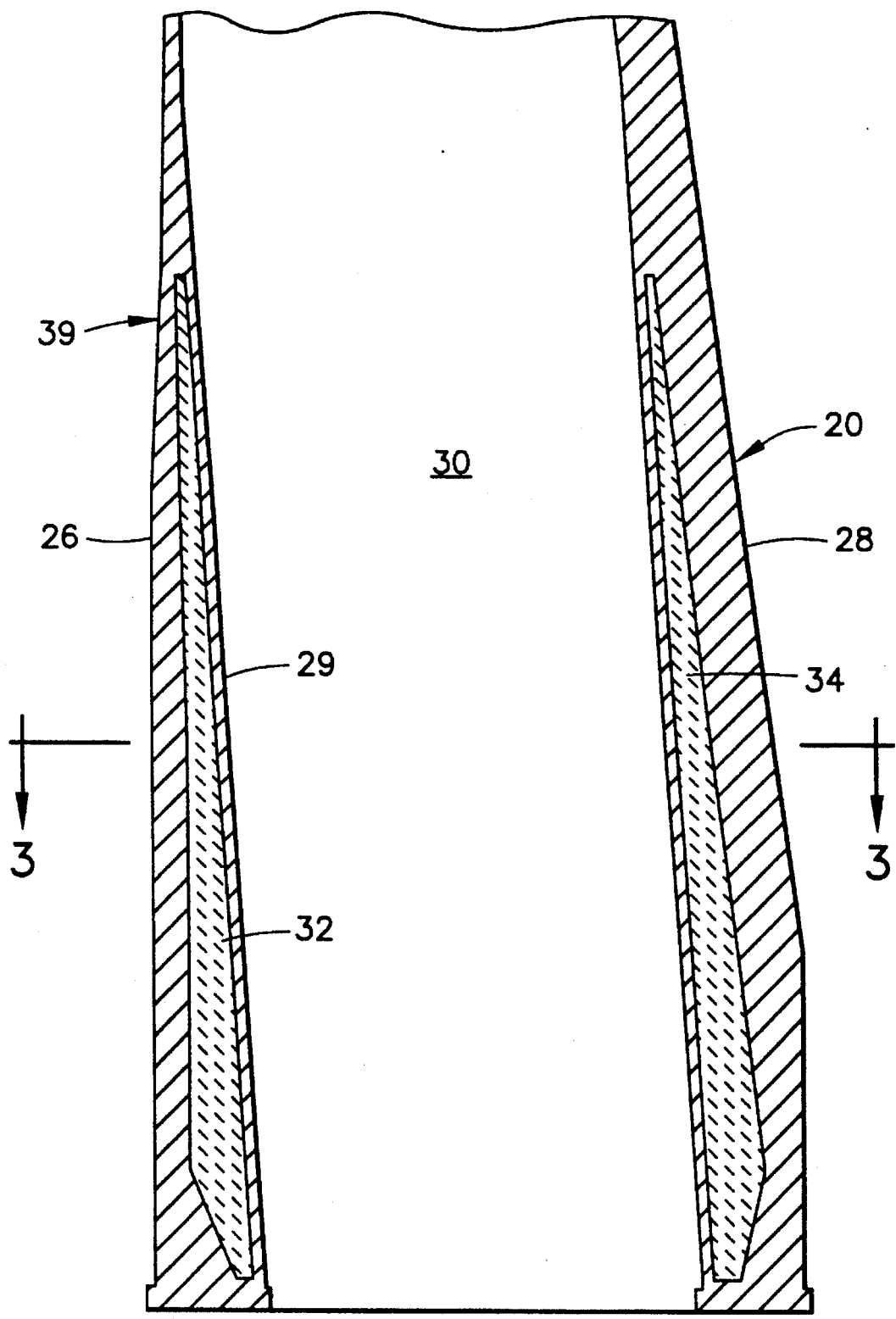
FIG. 4 is a partial section taken along line IV—IV in FIG. 3.

Referring to FIGS. 3 and 4, each strut 20 includes a top portion 22, a bottom portion 24, a leading edge portion 26 and a trailing edge portion 28. Portions 22, 24, 26 and 28 integrally connect to each other and define an inner surface 29. Inner surface 29 defines a cavity 30. Portion 26 includes a leading edge insert 32 embedded therein and portion 28 includes a trailing edge insert 34 embedded therein. Preferably, the strut shell or peripheral structure 39, which is the strut 20 without the inserts 32 and 34, is made of cast titanium or an alloy thereof.

Figure 5:
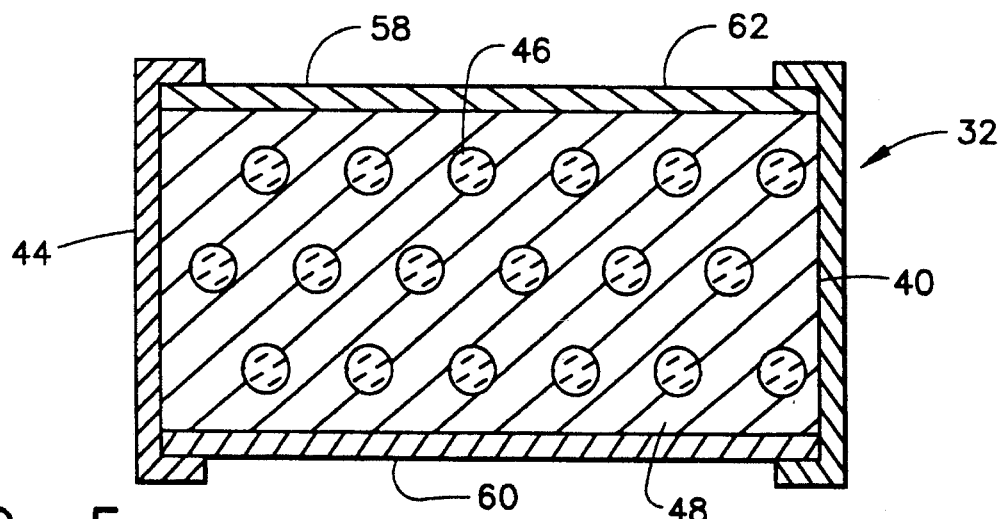
FIG. 5 is a sectional view of an insert made in accordance with the present invention.
Figure 6:
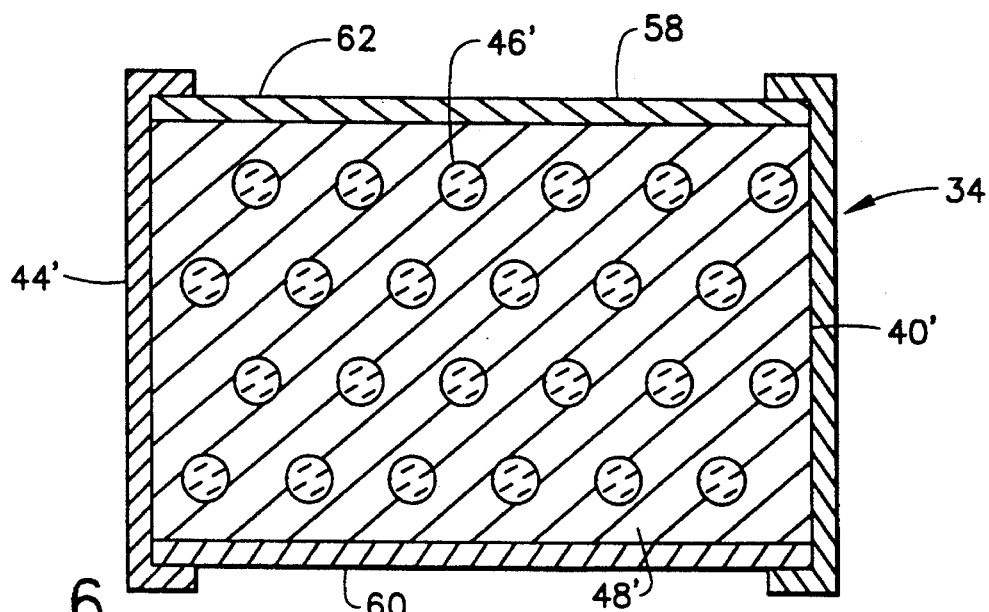
FIG. 6 is a sectional view of another insert made in accordance with the present invention.

Referring to FIGS. 5 and 6, the inserts 32 and 34 are formed by a metal matrix composite (MMC) core 40, 40' surrounded by a sheath 44, 44'. The C core 40 is comprised of a plurality of reinforcing fibers 46, 46' embedded in a metallic matrix 48, 48'. The fibers 46, 46' are contained in a plurality of rows and extend in the longitudinal direction. There is great design flexibility in locating the reinforcing fibers within the matrix 48, 48', such as in fiber spacing, directionality of successive layers of fibers and the like. Preferably, the sheath 44, 44' is made of the same material as the shell 39, titanium or an alloy thereof such as Ti-6-2-4-2 titanium alloy. The sheath may also be made of a metal alloy which melts at a higher temperature than the titanium alloy, such as tantalum, niobium, and molybdenum. However, it is necessary that the higher temperature material not form a eutectic with the tianium alloy at or below the melting temperature of the titanium alloy. For example, chromium would be unsuitable. The fibers 46, 46' are preferably made of a ceramic material such as a silicon carbide titanium composite material, such as SCS-6™ fiber manufactured by Textron Specialty Metals Corporation. However, the fibers 46 can be made of a carbide or any other oxide-type ceramic, such as alumina.

It is known in the art to embed an MMC article having a titanium alloy matrix as an insert in a larger titanium component by diffusion bonding, or superplastic forming/diffusion bonding (SPFDB). SPFDB processing is typically done at temperatures of about 1700° F, which is well below the melting temperature of titanium alloys. The only significant damage to reinforcing fibers at this temperature is likely to be breakage, which may occur if local fiber stresses caused by SPFDB processing exceed the strength of the fibers. However, prior attempts to cast a titanium alloy around inserts made according to the prior art resulted in attack by the molten titanium alloy on individual reinforcing fibers 46, 46' and/or the matrix 48, 48'. Molten titanium alloys are far more reactive than solid titanium alloys, where contact during manufacturing processing takes place at much lower temperatures. The use of the sheath 44 prevents the molten titanium alloy, which subsequently becomes the peripheral structure 39, from attacking and degrading the fibers 46, 46' of the inserts 32 and 34.

Figure 7:
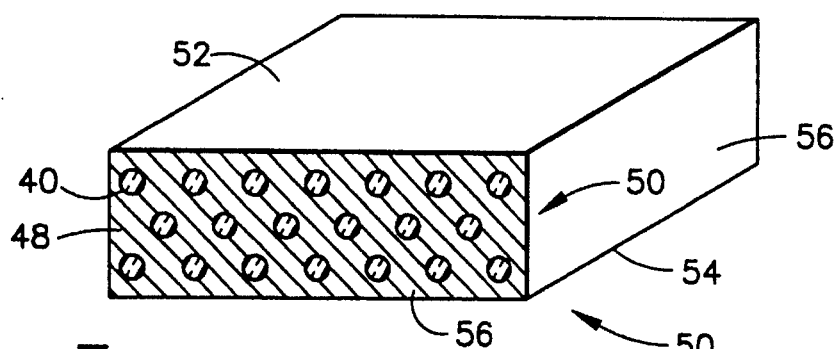
FIG. 7 is a perspective view of a block of a metal matrix composite.
Figure 8:
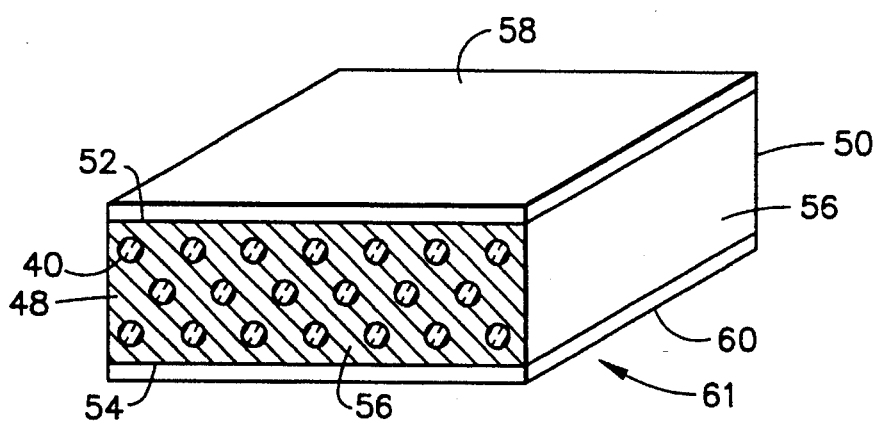
FIG. 8 is a perspective view of the block shown in FIG. 7 having an upper metal foil and a lower metal foil attached to the block.

Before the MMC cores 40, 40' can be formed, MMC blocks 50, as shown in FIG. 7, are made by the commonly known methods: the thermal spray method and the foil/fiber/foil (FFF) method. In the thermal spray method, the reinforcing fiber is wound around a cylindrical forming mandrel; matrix material is then thermal sprayed onto the reinforcing fibers; the fibers coated with matrix material are then cut in a direction parallel to the axis of the mandrel; and the resulting sheet-like material, conventionally known as a tape, is peeled from the mandrel. The length of the tape is limited to the circumference of the mandrel. In the present case, the diameter of SCS-6™ fibers is about 0.0056 inch, and the center-to-center spacing between adjacent fibers is about 0.008 inch, so there is ample opportunity to substantially fill the space between adjacent fibers with matrix material. Several layers of tape are stacked up, with careful attention to the orientation of the reinforcing fibers in each layer relative to a common system of coordinates, forming a block 50. As shown in FIG. 8, two titanium foil layers 58, 60 are layered over the upper surface 52 and lower surface 54. The titanium foil layers 58, 60 should be between 10 mil and 20 mil thick and preferably 10 mil thick. The structure is then tack welded for convenience in handling and then consolidated by, for example, hot isostatic pressing at a temperature of approximately 1600° F. at a pressure of 800 psi or higher for approximately three hours between suitably configured dies forming a plate 61.

In the FFF method, the reinforcing fibers are preferably provided in mat form, where the reinforcing fibers are aligned in one direction and substantially finer wires of the matrix material are woven between the reinforcing fibers in a direction perpendicular to that of the fibers. Several layers of mat are interleaved with foil of the selected matrix material and stacked up as required, with the same attention to fiber orientation. This assembly, with foil layers 58, 60, is then tack welded and consolidated as described above. Alternatively, the tack welded assembly may be placed in a "can". The can may be made of any material capable of withstanding high pressures. Preferred materials are steel and monel. The can is then evacuated, sealed and hot isostatically pressed to consolidate the MMC article.

The above-described fibers have a higher stiffness and strength-to-weight ratio than titanium; however, the fibers degrade at temperatures in the range of 1700° F. to 2000° F., whereby the strength-to-weight ratio decreases. Specifically, the tensile strength and elastic modulus of the SCS-6™ fiber at ambient temperature are 500,000 psi and 55,000,000 psi, respectively. It is believed that the block 50 has a longitudinal elastic modulus (i.e., in the direction of the fibers) of 32,000,000 psi and a transverse elastic modulus (i.e., in a transverse direction of the fibers) of 24,000,000 psi. Accordingly, orientation of the fibers 46, 46' is important in the design of the insert.

Typically, the MMC rectangular plates 61 are about 0.1–1.0 inch thick and two feet long and one-half foot wide. The blocks 50 have an upper surface 52, a lower surface 54 and side surfaces 56.

The plate 61 is then machined to the desired shape, such as by electrical discharge machining (EDM). The thickness of plate 61 is the maximum material required for the finished insert. This approach reduces the amount of wasted MMC due to the machining process. The upper and lower surfaces of plate 61 that are not machined have a monolithic titanium layer residual from the original machining process. Alternatively, the inserts could be made near net shape by utilizing a die having a cavity design representing the shape of the insert. This would substantially eliminate the intermediate machining.

Figure 9:
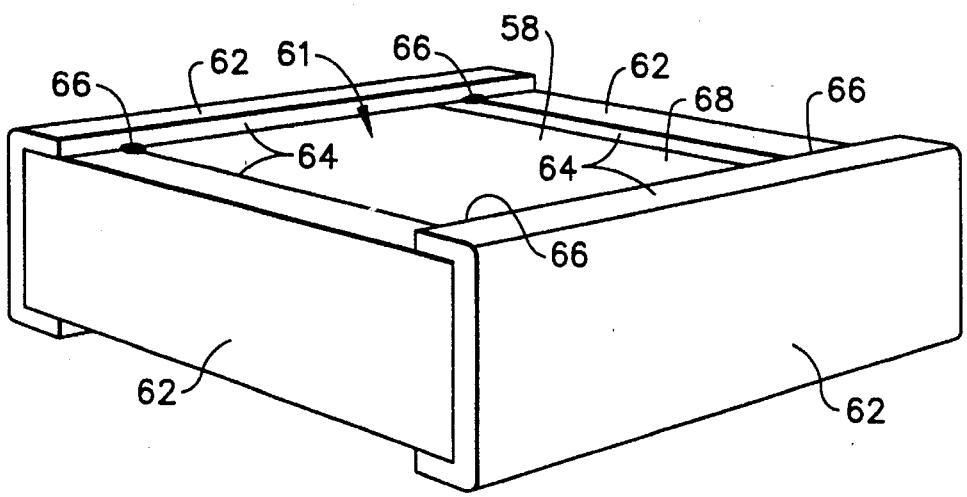
FIG. 9 is a perspective view of the insert shown in FIG. 6.

Then, as shown in FIG. 9, additional 10 mil titanium side foil layers 62 are wrapped around any exposed MMC surface. Edges 64 of foil layers 62 are then overlapped over adjacent surfaces of foil and attached by tack welds 66 to the initial upper layer and lower layer thereby forming the inserts 32 and 34. It is believed that layers 58, 60 and 62 can be applied through the plasma spray process. The inserts are then placed in a ceramic mold and a thin film of titanium on the order of 50–150 mils is cast completely around the inserts 32 and 34. The molten titanium embeds the inserts 32 and 34 and bonds to the foil layers 58, 60 and 62. The casting is then chilled thereby forming a strut 20, which is substantially stronger and lighter weight than conventional struts. It is believed that a portion of the sheath 44, 44' melts during the casting process and resolidifies during the chilling of the cast part thereby integrally connecting the sheath 44, 44' to the cast part. Subsequent to chilling the casting is non-destructively evaluated for casting anomalies, weld repaired and then hot isostatically pressed to correct internal discontinuities. The hot isostatic pressing also assures that the inserts 32, 34 are fully integrated in the strut 20. The strut 20 is then chemically machined removing the alpha or high oxygen enriched layer of the molded composite. Further, a welding prep is machined on a portion of the strut.

It has been found that the sheath 44, 44' formed by the foil layers 58, 60 and 62 acts as a thermal and chemical insulator and permits the fibers 46, 46' to withstand high temperatures of the molten titanium for a limited period of time without affecting the mechanical integrity of the core 40, 40'. However, too thin of foil layers 58, 60 and 62 could cause damage to the fibers 46, 46' during casting because of insufficient insulating properties. Further, too thin of foil layers 58 and 60 could melt during casting whereby molten metal would contact and destroy the fibers 46 because of heat and chemical contamination. Alternatively, too thick of a sheath 44, 44' formed by foil layers 58 and 60 could result in a less stiff strut 20 because of a smaller metal matrix core 40. Further, too thick of a sheath 44, 44' may require a larger mold and substantial machining of the molded part.

Furthermore, it has been found that molten titanium solidifies immediately on contact with the titanium foil layers 58 and 60. This is due to the fact that the molten titanium is not superheated. Accordingly, the foil layers 58 and 60 need not be welded completely over the respective overlapping edges 64 to prevent the molten titanium from flowing between the overlapped edges 64 due the capillary effect.

The strut 20 can then be further machined and tested so that a resulting lightweight, high strength and high stiffness strut 20 is manufactured. It is believed that the strut 20, made in accordance with the above-described insert, can result in a frame stiffness increase of 25%–40% which will result in a 0.3%–1% decrease in engine fuel consumption and for the respective parts can result in a 15%–20% weight savings of the individual components. The high stiffness of the insert is the most important factor in improving the performance of the strut 20. Since the block 50 is a non-isotropic material which is stiffer than titanium and varying modulus of elasticity which depends on the orientation of the fibers 46 and 46'. In the strut 20, the fibers run in a longitudinal direction to increase the beam stiffness properties of the strut 20. The thickness of the sheath 44, 44' depends on the particular piece molded, i.e., thickness and size of the molded piece as well as procedures used to solidify the molten titanium. It is believed that a portion of the sheath outer surface 68 melts during the casting process and re-solidifies during the chilling of the cast part thereby integrally connecting the outer surface 68 to the cast part.

The particular placement and design of the inserts 32 and 34 of strut 20 depend on the load characteristics of the individual parts. The load characteristics can be determined through well-known computational techniques, such as finite element, resulting in an optimum designed part.

The present invention need not be limited to aircraft engine struts, but can be used in any application utilizing a cast-in-place insert where the cast material has a melting temperature greater than the degradation temperature of material used in the insert.

Articles have been fabricated according to the present invention using titanium alloys and the low pressure plasma spray fabrication method. The specific alloys used in fabricating articles were: peripheral structure 39 - cast Ti-6Al-4V (Ti-64); sheath 44, 44'- Ti-64 sheet; and core 40, 40'- low pressure plasma sprayed Ti-6Al-2Sn-4Zr-2Mo (Ti-6242). It is believed that materials used in the FFF method would be the same, except that foil of Ti-64 or a beta alloy such as Ti-15V-3Cr-3Al-3Sn would be used for the matrix 48, 48'. Further, it is believed that a similar insert having fibers of silicon carbide or boron can be utilized in struts in which aluminum alloys are substituted for titanium alloys.

Having described the presently preferred embodiments of our invention, it is to be understood that it may be otherwise embodied within the scope of the appended claims.

We claim:

1. A method for forming a structural element comprising the steps of:

a) forming a metal matrix composite structural core having non-metallic filaments with a first degrading temperature;

b) attaching a sheath to said core by encasing the core with the sheath, said sheath comprising a metal having a second melting temperature above said degrading temperature thereby forming an insert;

c) inserting said insert into a mold cavity;

d) pouring molten metal into the mold cavity to form a peripheral element, said molten metal being the same as said sheath material, said molten metal surrounding said insert; and e) cooling said molten metal thereby forming a structural element whereby said insert is embedded within the peripheral element.

2. The method for forming a structural element of claim 1 wherein said filament is a ceramic material.

3. The method for forming a structural element of claim 2 wherein said filament is silicon carbide.

4. The method for forming a structural element of claim 2 wherein the metal comprises titanium.

5. The method of claim 2 wherein said a second metallic is formed by:

stacking a plurality of sections formed of a monotape on top of each other, the monotape comprising a plurality of non-metallic filaments extending in a row and surrounded by a metallic coating;

attaching said sections to each other to form an integral structure by pressing, thereby forming the metal matrix composite core having an upper and a lower surface, the method further comprising:

attaching a first metallic sheath to the upper and the lower surface thereby forming an integral structure;

machining said integral structure to an insert shape; and attaching a second metallic sheath to any exposed core surface.

6. The method of claim 5 wherein said monotape sections are subjected to hot isostatic pressing.

* * * * *